(12) United States Patent
Ouyang et al.

(10) Patent No.: US 10,698,465 B1
(45) Date of Patent: Jun. 30, 2020

(54) SYSTEM AND METHOD FOR EFFICIENT ENERGY DISTRIBUTION FOR SURGE POWER

(71) Applicant: QUANTA COMPUTER INC., Taoyuan (TW)

(72) Inventors: Kuang-Hua Ouyang, Taoyuan (TW); Kuo-Chan Hsu, Taoyuan (TW); Yun-Teng Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/410,844

(22) Filed: May 13, 2019

(51) Int. Cl.
  *G05F 1/56* (2006.01)
  *G06F 1/28* (2006.01)
  *H02J 7/00* (2006.01)

(52) U.S. Cl.
  CPC .............. *G06F 1/28* (2013.01); *G05F 1/56* (2013.01); *H02J 7/007* (2013.01); *H02J 7/0063* (2013.01); *H02J 2207/20* (2020.01)

(58) Field of Classification Search
  CPC ........ H02M 3/07; H02M 3/158; H02M 3/155; H02M 3/1582; H02M 3/28; H02M 3/156; H02M 3/337; H02M 3/335; H02M 3/33507; H02M 3/33592; H02M 3/33576; H02M 3/33569; H02M 2001/0009; H02M 2001/0006; H02M 7/12; H02M 7/48; H02M 1/00; H02M 1/4255; H02M 1/08; G05F 1/56
  See application file for complete search history.

(56) References Cited

U.S. PATENT DOCUMENTS

| | | | | |
|---|---|---|---|---|
| 5,601,741 | A * | 2/1997 | Thommes | B23H 7/08 219/130.21 |
| 5,937,828 | A * | 8/1999 | Watanabe | F02D 41/20 123/490 |
| 6,104,737 | A * | 8/2000 | Mahmoudi | H01S 3/097 363/143 |
| 9,634,512 | B1 * | 4/2017 | Kim | H02J 7/0031 |
| 10,311,685 | B1 * | 6/2019 | Long | G08B 3/10 |

(Continued)

FOREIGN PATENT DOCUMENTS

WO 9731423 A1 8/1997

OTHER PUBLICATIONS

Extended European Search Report for EP Application No. 19188748.8, dated Feb. 28, 2020.

*Primary Examiner* — Thienvu V Tran
*Assistant Examiner* — Nusrat Quddus
(74) *Attorney, Agent, or Firm* — Nixon Peabody LLP (57) ABSTRACT

A system and method for providing additional power to a connected load is disclosed. The system includes a power supply unit and an energy storage unit coupled to the power supply unit. A switch has an input coupled to the power supply unit. A power output provides power to the connected load. The power output is coupled to an output of the switch and the energy storage unit. A controller is operative to provide a charging period where the switch is turned on to provide power to the power output. The controller provides a boost period where the switch is controlled via a pulse width modulation signal to connect the power supply with the energy storage unit to supply power to the load when the switch is on, and with the energy storage unit to supply power to the load when the switch is off.

15 Claims, 5 Drawing Sheets

(56) References Cited

U.S. PATENT DOCUMENTS

| | | | | |
|---|---|---|---|---|
| 2008/0137242 A1* | 6/2008 | Chen | | H04B 3/56 361/55 |
| 2009/0110214 A1* | 4/2009 | Litovsky | | H02J 7/0004 381/106 |
| 2009/0134817 A1* | 5/2009 | Jurngwirth | | H05B 33/0827 315/307 |
| 2010/0318814 A1* | 12/2010 | Chung | | H02M 3/156 713/300 |
| 2011/0121653 A1 | 5/2011 | Hartular et al. | | |
| 2012/0019190 A1* | 1/2012 | Jones | | H01M 10/44 320/101 |
| 2012/0086276 A1 | 4/2012 | Sawyers | | |
| 2012/0133295 A1* | 5/2012 | Pereira | | H05B 33/0815 315/210 |
| 2012/0200276 A1* | 8/2012 | Van Dijk | | H02M 3/158 323/283 |
| 2013/0106179 A1* | 5/2013 | Sievers | | B60R 21/017 307/9.1 |
| 2013/0124051 A1* | 5/2013 | Sievers | | B60R 21/017 701/45 |
| 2013/0264879 A1* | 10/2013 | Shih | | H02J 9/005 307/66 |
| 2013/0271077 A1* | 10/2013 | Kim | | H02J 7/0052 320/109 |
| 2014/0001971 A1* | 1/2014 | Kumar | | H05B 41/2883 315/200 R |
| 2014/0049159 A1* | 2/2014 | Kumar | | H05B 41/16 315/34 |
| 2014/0159611 A1* | 6/2014 | Elferich | | H05B 33/0803 315/294 |
| 2014/0269840 A1* | 9/2014 | Hsiao | | G01K 7/16 374/184 |
| 2015/0117070 A1* | 4/2015 | Wang | | H02M 3/33561 363/21.14 |
| 2015/0381062 A1* | 12/2015 | Arisawa | | H02M 3/155 62/508 |
| 2016/0305392 A1* | 10/2016 | Nakamura | | F02P 3/051 |
| 2016/0320827 A1* | 11/2016 | Ou Yang | | G06F 1/3206 |
| 2017/0338680 A1* | 11/2017 | Baier | | H02M 3/33507 |
| 2018/0348309 A1* | 12/2018 | Ou Yang | | G01R 31/40 |

* cited by examiner

SYSTEM AND METHOD FOR EFFICIENT ENERGY DISTRIBUTION FOR SURGE POWER

TECHNICAL FIELD

The present disclosure relates generally to power systems for computing devices. More particularly, aspects of this disclosure relate to a system that enables an energy storage unit to be discharged in order to boost the performance of components such as processors.

BACKGROUND

Current application servers are centered around processing devices such as CPUs and specialized processors such as graphic processing units (GPUs). A server will have multiple CPU and GPU chips. Computing capability of such servers depends on the number, and the computing power, of the general processors or specialized processors. As processors are improved for greater speed and capability, the need for more power has also increased.

Typically, CPU and GPU chips require more and more power as their processing speed and capability increase. Thus, the greater the power supplied, the higher the performance in such chips. Such chips are designed to have a peak power mode for maximum performance. The performance may be reduced for such chips when not in peak power mode. Providing lower power saves the power budget of the system. The power budget is typically determined by calculating the power need for all components in a system. This allows the selection of a suitable PSU for the system. Usually the power budget is based on maximum power of the system, not the peak power of the system. Thus, a selected power supply unit (PSU) often comes at the cost of lower performance. However, designers may provide higher powered PSUs to support peak power on request to such chips when maximum performance is required. Such higher powered PSUs are more expensive and require more footprint space on a mother board. Further, higher power may not be necessary during periods where peak processing capability is not required. In such cases, a higher powered PSU is underutilized.

There is therefore a need for a system that provides a surge of power for a processor chip to provide greater performance. There is a further need for a system that can provide greater power for a processor chip while still saving the power budget of a PSU. There is also a need for a system that allows the use of smaller capacitors in an energy storage unit for power boosts.

SUMMARY

One disclosed example is a system for providing additional power to a connected load. The system includes a power supply unit (PSU) and an energy storage unit coupled to the PSU. A switch has an input coupled to the PSU. A power output provides power to the connected load. The power output is coupled to an output of the switch and the energy storage unit. A controller is operative to control the switch, and enable and disable a charging circuit connected to the energy storage unit.

Another disclosed example is a method of providing power boosts to a load in a computer system. Power is provided to the load via a PSU in a charging period. An energy storage unit is charged via the (PSU) in the charging period. A switch is controlled to enable and disable connection of the energy storage unit to the load.

Another disclosed example is a circuit that provides power boosts to a system load. The circuit includes a PSU and a shunt resistor coupled to the PSU. The circuit includes an energy storage unit coupled to the PSU through the shunt resistor. The energy storage unit is charged by the PSU. A switch has an input coupled to the PSU. A power output provides power to the system load. The power output is coupled to an output of the switch and the energy storage unit. A buck converter is coupled between the energy storage unit and the power output. The buck converter allows discharge of stored power from the energy storage unit to the power output. A controller is operative to provide a charging period where the switch is turned on to provide power to the power output. The controller is operative to provide a boost period, where the switch is controlled via a pulse width modulation signal. The pulse width modulation signal connects the power supply with the energy storage unit to supply power to the load when the switch is on; and with the energy storage unit to supply power to the load when the switch is off during a boost period.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is a system that provides periodic power boosts to maximize the performance of components such as processor. The disclosed system uses a pulse width modulation (PWM) signal to control a switch, such as a MOSFET, to add power from an energy storage unit periodically to provide greater power to a component than the maximum provided by a PSU alone. During other periods, the system allows the energy storage unit to be charged. This system allows a saving of the power budget of a PSU while maintaining the performance of the PSU to a system load. Also, the PSU utility may be maintained at a light load period.

Figure 1:
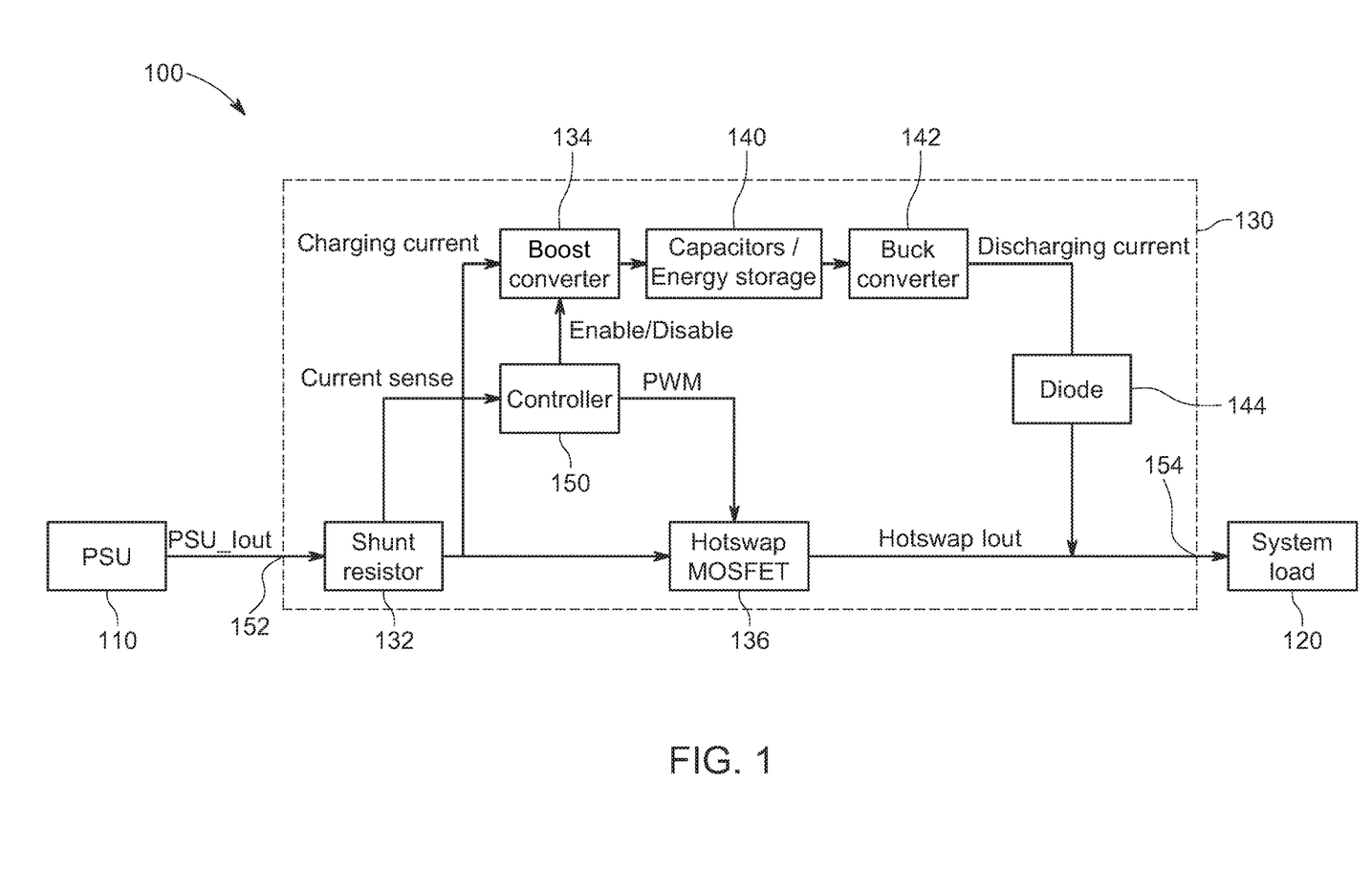
FIG. 1 is a block diagram of an example power boost system that provides surges of power to a component such as a processor.

FIG. 1 is a block diagram of an example computer system 100 with the ability to produce greater power periodically. The computer system 100 includes a PSU 110 that supplies power to a component such as a system load 120. The system load 120 may be a component such as a central processing unit (CPU) or a specialized processor such as a graphic processing unit (GPU). The system load 120 may operate at different performance levels depending on the power supplied to the system load 120. For example, if the system load 120 is a GPU, the GPU may allow for faster processing when a higher power level is provided.

The computer system 100 includes a boost circuit 130. The boost circuit 130 includes a shunt resistor 132 that is coupled to the output of the PSU 110. The shunt resistor 132 is coupled to a boost converter 134 and the input of a hotswap MOSFET 136. The boost converter 134 is connected to an energy storage unit 140. In this example the energy storage unit 140 includes a capacitor or multiple capacitors that can store sufficient power for powering the system load 120. The energy storage unit 140 is coupled to a buck converter 142 that is coupled to one end of a diode 144. A controller 150 senses current from the shunt resistor 132 and provides control signals to the boost converter 134 and the control input of the hotswap MOSFET 136. The current of the shunt resistor 132 is measured to determine whether the output power of the PSU 110 has reached the maximum power. As will be explained below, when the charging cycle of the energy storage unit 140 is complete, the PSU 110 reaches maximum power, and a boost cycle can be initiated.

The boost circuit 130 includes an input 152 that is connected to the PSU 110, and an output 154 that is connected to the system load 120. The other end of the diode 144 is connected to the output 154 to provide additional boost power from the energy storage unit 140. The output of the MOSFET 136 is connected to the output 154. As will be explained below, the boost circuit 130 may provide periodic boosts of power to the system load 120 to increase performance, without increasing energy output from the PSU 110.

Figure 2:
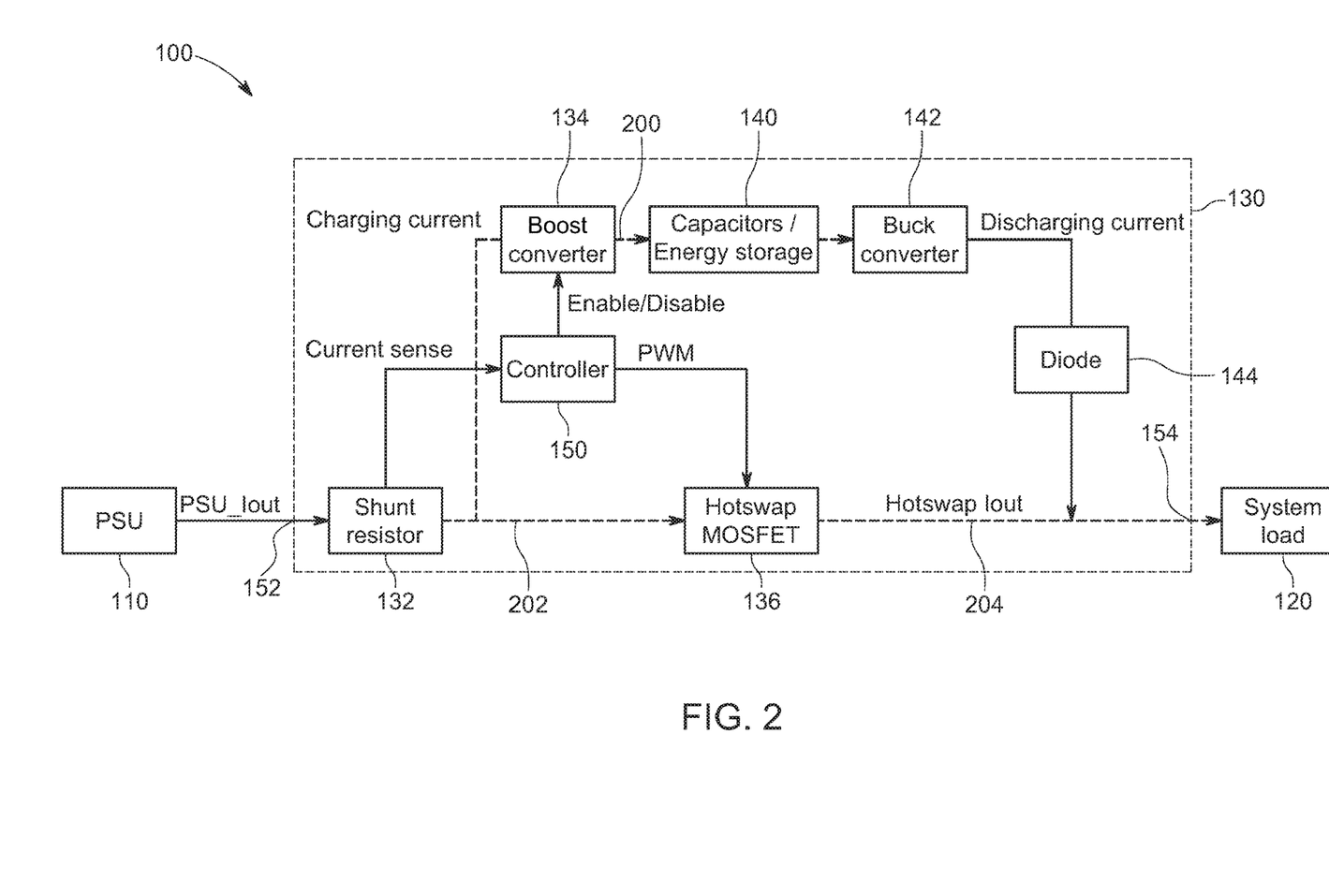
FIG. 2 is a block diagram of the system in FIG. 1 showing the power flow to the component when the capacitors are charging.

FIG. 2 shows the system 100 in FIG. 1 when the system load 120 requires less than the maximum current output of the PSU 110. In this charging state, the combination of the current required by the system load 120 and the charging current to the energy storage unit 140 is less than the maximum current output from the PSU 110. The capacitors of the energy storage unit 140 reach full charge and are held until the next peak current event occurs.

Extra energy from the PSU 110 may be used to charge the capacitors in the energy storage unit 140, as shown by a dashed line 200. Part of the output of the PSU 110 is routed through the shunt resistor 132 to the boost converter to charge the energy storage unit 140. The controller 150 enables the output of the boost converter 134 when the energy storage unit 140 is not charged. The controller 150 may adjust the output of the boost converter 134 in conjunction with the PSU 110 based on the power needs of the system. For example, the PSU may have a maximum power of 800 W and the energy storage charging circuit maximum power is 100 W. If the system load is 400 W, the energy storage circuit can charge to the full charge of 100 W and stop. The PSU provides 500 W during this moment. If system load is 750 W, the energy storage circuit can charge to a maximum of 50 W during this moment until full charge. The PSU can provide 800 W during this moment, once the PSU provides over 800 W, the controller will stop charging the energy storage circuit and the energy storage discharges for system power. When enabled, the boost converter 134 provides power to charge the capacitors of the energy storage unit 140. In this mode, the buck converter 142 is switched off by the controller 150 and therefore does not provide power to the diode 144. Thus, no additional power is provided from the energy storage unit 140 from the output 154.

The controller 150 turns the MOSFET 136 on for the period of the charging state. Thus, power supplied by the PSU 110 is also routed through one input of the MOSFET 136, as shown in a dashed line 202. Since the MOSFET 136 is turned on, the power is routed through the other input of the MOSFET 136 to the output 154, and to the system load 120 as shown by a dashed line 204.

Figure 3:
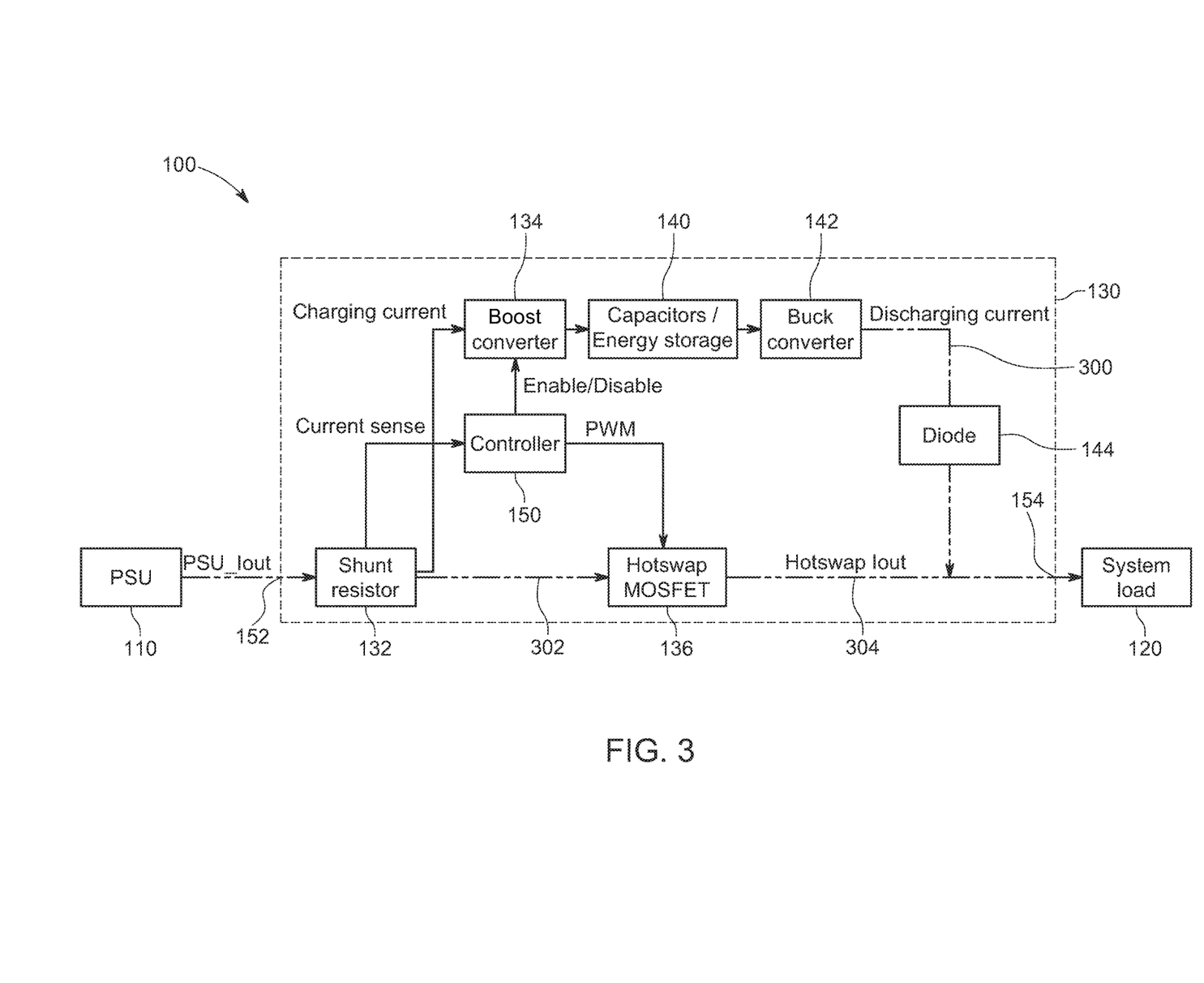
FIG. 3 is a block diagram of the system in FIG. 1 showing the power flow to the component to maximize performance when the capacitors are at full charge.

FIG. 3 shows the system 100 in FIG. 1 when the system load 120 requires more power than what is typically supplied by the PSU 110. In this mode, the required current for the system load 120 is greater than the maximum current of the PSU 110. This may occur when the maximum performance of the system load 120 requires greater than the maximum current of the PSU 110. In this case, the boost circuit 130 is disabled, and the buck converter 142 connects the output of the capacitors in the energy storage unit 140 to be discharged for peak power to be provided to the system load 120. The flow of power from the energy storage unit 140 may be seen by a dashed line 300. The controller 150 therefore hotswaps the PSU 110 via the MOSFET 136 by applying a pulse width modulation signal to turn the MOSFET 136 on and off. Thus, the PSU 110 supplies power to the system load 120 at a certain level while the MOSFET 136 is on. When the MOSFET 136 is on, power from the PSU 110 flows to the input of the MOSFET 136, as shown by a dashed line 302; and through output of the MOSFET 136 to the output 154, as shown by a dashed line 304. This results in supplying greater than the maximum power to the system load 120. When the MOSFET 136 is turned off, the PSU 110 is disconnected from the output 154. The energy storage unit 140 alone thus supplies the system load 120, as shown by the dashed line 300. The power therefore declines from the maximum output while the MOSFET 136 is off.

The boost from the energy storage unit 140 continues until the capacitors are discharged. Once this occurs, the system 100 returns to the charging mode shown in FIG. 2. As explained above, the system load current and the charging current in the charging mode is less than the maximum current from the PSU 110. The PSU 110 thus charges the energy storage unit 140. This is maintained until the next peak current event occurs.

Figure 4A:
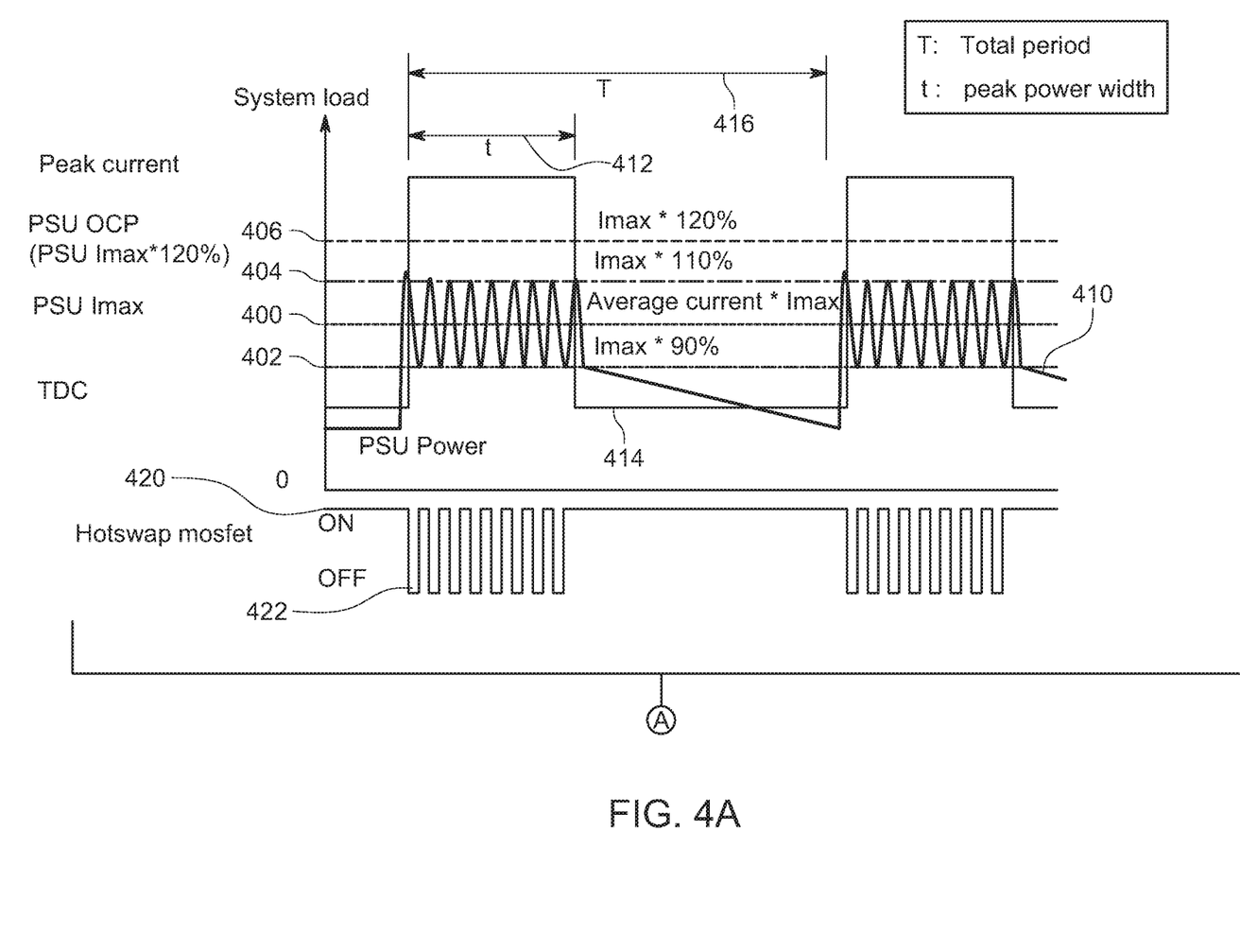
FIGS. 4A and 4B are timing diagrams of the control signals for the components in FIG. 1, and the resulting power output signal to the system load.
Figure 4B:
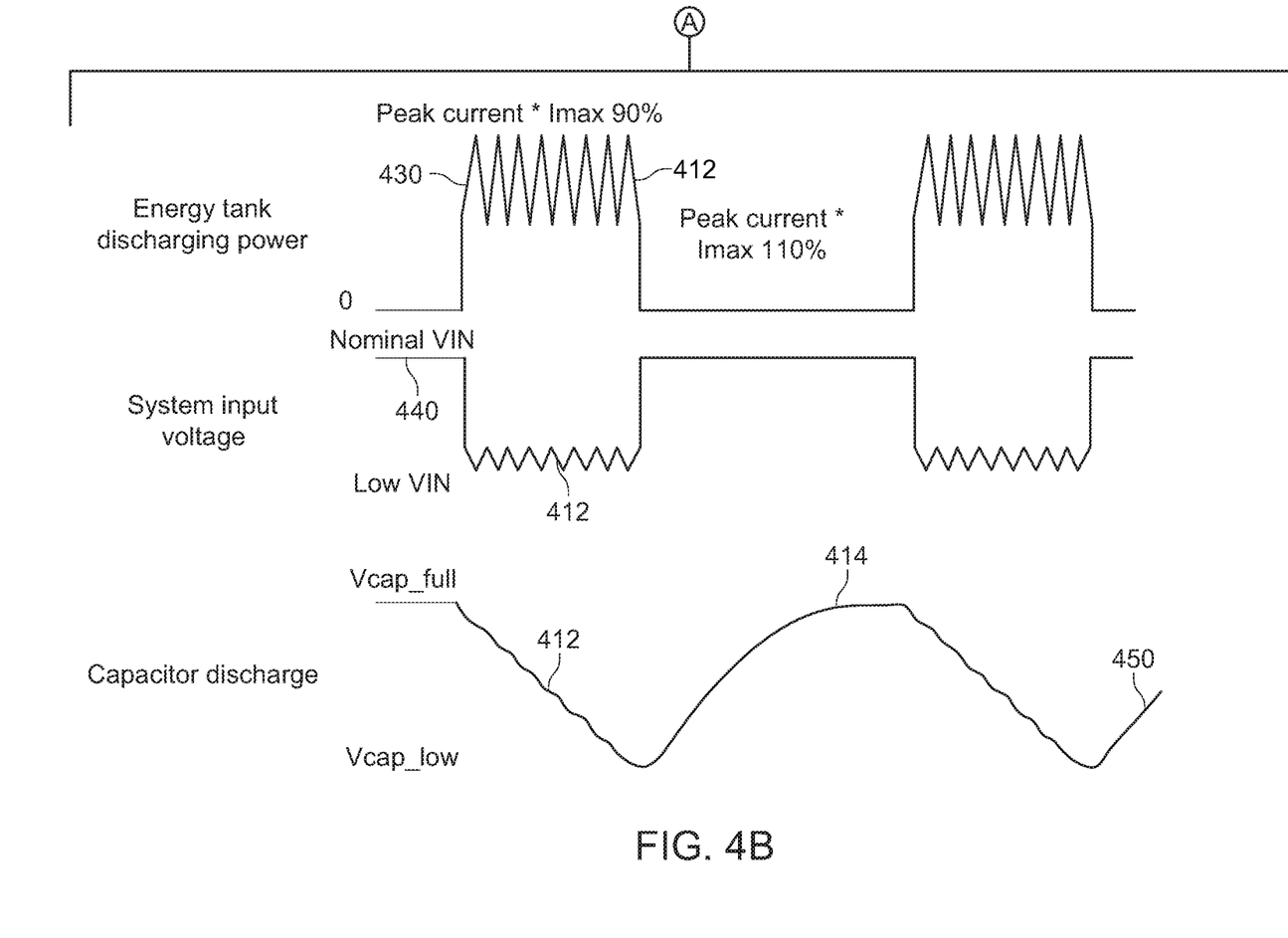

FIG. 4A-4B are a voltage diagram of the signals for the components shown in FIGS. 1-3 during a power boost and charging cycle. As explained above in relation to FIG. 2, during the charging mode, the system load 120 is only powered by the PSU 110. During the power boost mode, as shown in FIG. 3, the system load 120 is alternately powered by the energy storage unit 140 alone and the energy storage unit 140 in combination with the PSU 110. FIG. 4A-4B includes a first horizontal dashed line 400 that represents the maximum current of the PSU 110. A second horizontal dashed line 402 represents 90% of the maximum current of the PSU 110. A third horizontal dashed line 404 represents 110% of the maximum current of the PSU 110. A fourth horizontal dashed line 406 represents 120% of the maximum current of the PSU 110. A trace 410 represents the output of the power provided to the system load 120. During a first time period 412, which is the period of the boost mode, the power supplied to the system load 120 may be boosted to 110% of the maximum current of the PSU 110. The power is then reduced during a second time period 414, which is the period of the charging mode, to under 90% of the maximum current of the PSU 110. An overall cycle period 416 thus is the time period 412 of the boost period and the time period 414 of the charging period.

As may be seen by the trace 410, the power provided during the charging period 414 is under 90% of the maximum current. Due to the extra power supplied by the energy storage unit 140, during the boost period 412, the power signal to the system load 120 alternates between 90% of the maximum current of the PSU 110 when the MOSFET 136 is off, and 110% of the maximum current of the PSU 110 when the MOSFET 136 is on. The sawtooth signal shape of the trace 410 is due to the periodic boost from the energy storage unit 140. Thus, while the MOSFET 136 is on, both the PSU 110 and the energy storage unit 140 provide power. Power thus increases to the level 404 where current is 110% of the maximum current of the PSU 110. At this point, the MOSFET 136 is turned off, thereby cutting off the PSU 110. The power is therefore only supplied by the energy storage unit 140. The power level thus declines until it reaches the level 402 where the current is 90% of the maximum current of the PSU 110. At this point, the MOSFET 136 is turned on again.

The control signal to the MOSFET 136 from the controller 150 is shown as a trace 420. The trace 420 is on during the entire charging period 414, and therefore power from the PSU 110 is directly supplied to the system load 120 through the MOSFET 136, as shown in FIG. 2. During the boost period 412, the trace 420 is toggled between on and off according to a pulse width modulation control signal 422 generated by the controller 150. In this case, as shown in FIG. 3, the PSU 110 and the energy storage unit 140 supply power to the system load 120 when the MOSFET 136 is on, and the energy storage unit 140 alone supplies power to the system load 120 when the MOSFET 136 is off.

A trace 430 shows the output power from the energy storage unit 140. During the charging period 414, the output power is zero because the buck converter 142 is deactivated, and the energy storage unit 140 is therefore not connected to the power output 154. During the boost period 412, the power output oscillates between a low point at the 110% peak current and the high point at 90% peak current in this example. The peak currents may be adjusted.

A trace 440 shows the system input voltage. During the charging period 414, the nominal voltage input is at a high level. During the boost period 412, the voltage input oscillates between a low voltage and another level. This is due to the system input path from the PSU 110 having a constant resistance (Power Plane+MOSFET Rds(on)) that is very small, when the system current, I, is increased, this will cause a voltage drop=I×R.

A trace 450 shows the capacitor discharge from the energy storage unit 140. During the charging period 414, the capacitors are charging and thus the discharge level starts at zero and increases exponentially until the level reaches full charge. Once the boost period 412 occurs, the capacitors start discharging linearly until their charge is depleted.

The power output, W, may be expressed as $W=\frac{1}{2}*C*V^2$, where C is the capacitance of the capacitors of the energy storage unit 140, and V is the input voltage to the energy storage unit 140. The advantage of the example system 100, is that increases in input voltage result in exponentially larger energy being stored by the energy storage unit 140. For example, if the input voltage is boosted from 12V to 48V, about 16× energy may be stored in input capacitors with the same capacitance. When a system load such as a CPU or a GPU may operate in a turbo mode activated by increasing power to the CPU or GPU, the input capacitors can provide more energy from the same limited power supply. Thus, the system 100 can provide more additional current in a short time to allow for a CPU or GPU to operate in turbo mode for that time period.

For example, if the power of the PSU 110 is 800 W, the output voltage of the PSU 110 is 12.2V, and the system nominal input voltage is 12V, then 110% of the power of the PSU is 800*110%=880 W. 90% of the power of the PSU is thus 720 W. The system peak power is 1000 W, and the system peak current time t=2 ms in this example. System peak current and timing is typically defined by the system load such as a CPU/GPU. Thus, different CPUs and GPUs have different peak current and timing.

In this example, the duty cycle of the PWM control signal applied to the MOSFET 136 is 20% on and 80% off. Thus, the energy storage unit 140 needs to provide 120 W when the MOSFET 136 is turned on, and needs to provide 280 W power during when the MOSFET 136 is turned off. The average power of the energy storage unit 140 in this example is 200 W. The average power of the PSU 110 is 800 W. The boost converter 134 is used to boost the input voltage to 48V to charge the capacitors of the energy storage unit 140.

The process of determining the capacitance required for the energy storage unit 140 is as follows:

$$Energy = Power * holdup\_time / 1000$$

$$Vcap\_capacitance = 1000 * 2 * Energy / (Vcap^2 - Vout^2)$$

Thus, in this example, a capacitance of at least 0.37 mF will required by the for the capacitance.

In comparison, if the above described MOSFET is not used, the energy storage unit alone will need to handle 1000 W for the discharge power. This will require a much larger capacitor of at least 1.85 mF. Thus, the above described boost circuit using the MOSFET 136 can save five times the capacitance to provide the same power boost.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system for providing additional power to a connected load, the system comprising:
    a power supply unit;
    an energy storage unit coupled to the power supply unit;
    a switch having an input coupled to the power supply unit;
    a power output providing power to the connected load, the power output coupled to an output of the switch and the energy storage unit; and
    a controller operative to control the switch and enable and disable a charging circuit connected to the energy storage unit, and wherein the controller is operative to provide a charging period to connect the power supply unit to the energy storage unit and where the switch is set to the on position to connect the power supply unit to the power output, wherein the controller is operative to provide a boost period, where the switch is controlled via a pulse width modulation signal to alternately connect the power supply unit and the energy storage unit to supply power to the power output when the switch is on and connect the energy storage unit to supply power to the load and disconnect the power supply unit when the switch is off.

2. The system of claim 1, wherein the energy storage unit includes at least one capacitor.

3. The system of claim 1, wherein the charging circuit includes:
    a shunt resistor coupled between the power supply unit and the energy storage unit; and
    a buck converter circuit coupled between the energy storage unit and the power output.

4. The system of claim 3, wherein the controller is operative to determine the current through the shunt resistor.

5. The system of claim 1, wherein the load is one of a central processing unit (CPU) or a graphic processing unit (GPU).

6. The system of claim 1, wherein the switch is a MOSFET.

7. The system of claim 1, wherein the power supply unit is set to output a current less than a maximum current output of the power supply unit to the power output.

8. A method of providing power boosts to a load in a computer system, the method comprising:
    providing power to the load via a power supply unit in a charging period by setting a switch to the on position to connect the power supply unit to the load;
    charging an energy storage unit via the power supply in the charging period; and
    during a boost period, controlling the switch via a pulse width modulation signal to alternately connect the power supply unit and the energy storage unit to supply power to the load when the switch is on and connect the energy storage unit to supply power and disconnect the power supply unit to the load when the switch is off.

9. The method of claim 8, wherein the energy storage unit includes at least one capacitor.

10. The method of claim 8 wherein a shunt resistor is coupled between the power supply unit and the energy storage unit; and wherein a buck converter circuit is coupled between the energy storage unit and the power output.

11. The method of claim 10, further comprising determining the current through the shunt resistor.

12. The method of claim 8, wherein the load is one of a central processing unit (CPU) or a graphic processing unit (GPU).

13. The method of claim 8, wherein the switch is a MOSFET.

14. The method of claim 8, wherein the power supply unit is set to output a current less than a maximum current output of the power supply unit to the power output.

15. A circuit that provides power boosts to a system load, the circuit comprising:
    a power supply unit;
    a shunt resistor coupled to the power supply unit;
    an energy storage unit coupled to the power supply unit through the shunt resistor, wherein the energy storage unit is charged by the power supply unit;
    a switch having an input coupled to the power supply unit;
    a power output providing power to the system load, the power output coupled to an output of the switch and the energy storage unit;

a buck converter coupled between the energy storage unit and the power output, the buck converter allowing discharge of stored power from the energy storage unit to the power output; and a controller operative to provide a charging period where the switch is turned on to provide power from the power supply unit to the power output, and a boost period, where the switch is controlled via a pulse width modulation signal to alternately connect the power supply unit and the energy storage unit to supply power to the load when the switch is on, and connect the energy storage unit to supply power to the load and disconnect the power supply unit when the switch is off.

* * * * *